United States Patent
Stipanovich

(10) Patent No.: US 7,036,869 B1
(45) Date of Patent: May 2, 2006

(54) MOTOR VEHICLE WINDOW CAGE

(76) Inventor: Susan Stipanovich, 15832 NE. 156th St., Woodinville, WA (US) 98072

( * ) Notice: Subject to any disclaimer, the term of this patent is extended or adjusted under 35 U.S.C. 154(b) by 0 days.

(21) Appl. No.: 11/204,681

(22) Filed: Aug. 15, 2005

Related U.S. Application Data

(60) Provisional application No. 60/604,590, filed on Aug. 26, 2004.

(51) Int. Cl.
*B60J 1/20* (2006.01)
(52) U.S. Cl. .............. 296/152; 49/50; 49/57; 119/484
(58) Field of Classification Search ............... 296/152; 119/484; 280/748; 49/50, 56, 57
See application file for complete search history.

(56) References Cited

U.S. PATENT DOCUMENTS

| | | | |
|---|---|---|---|
| 3,032,351 A * | 5/1962 | Lewis, Jr. ................ 280/748 |
| 3,743,001 A | 7/1973 | Baxter et al. ............ 160/105 |
| 4,398,586 A | 8/1983 | Hall ....................... 160/105 |
| 4,653,562 A | 3/1987 | Moss et al. .............. 160/105 |
| 4,854,364 A | 8/1989 | Junker ..................... 160/105 |
| 4,913,212 A | 4/1990 | Clavier .................... 160/105 |
| 5,570,542 A | 11/1996 | Cameron .................. 49/463 |
| 5,768,827 A * | 6/1998 | Hackett ...................... 49/57 |
| 5,829,388 A | 11/1998 | Rosso ..................... 119/416 |
| 6,042,473 A | 3/2000 | McClary .................. 454/133 |
| 6,192,628 B1 | 2/2001 | Pinheiro et al. ............. 49/70 |
| 6,722,315 B1 | 4/2004 | Sinor ...................... 119/484 |

* cited by examiner

*Primary Examiner*—Joseph D. Pape
(74) *Attorney, Agent, or Firm*—Dean A. Craine

(57) ABSTRACT

A motor vehicle window cage that fits into and extends through a motor vehicle opening that allows a pet to safely place it's head through the window opening when the motor vehicle is moving or parked. The cage is made up of a mesh-like material with a top mesh surface, two side mesh surfaces, and a front mesh surface. Formed on the cage is a rear opening and a bottom base. The bottom base acts as a shelf that allows the pet to stand in the seat and rests its front paws on the shelf. The cage is designed to confine the animal inside the motor vehicle yet allow the window to be extended downward to provide fresh air. The cage component can be easily attached and detached from the motor vehicle with two sets of adjustable straps that extend around the door's upper and lower frames without modifying or alternating the motor vehicle.

10 Claims, 6 Drawing Sheets

MOTOR VEHICLE WINDOW CAGE

BACKGROUND OF THE INVENTION

This utility patent application is based on the provisional patent application (Ser. No. 60/604,590) filed on Aug. 26, 2004.

1. Field of the Invention

The invention is related to animal husbandry and more particularly to a portable enclosure designed to confine animals to a restricted area.

2. Description of the Related Art

Heretofore, temporary screens that fit into the window opening in the door of a motor vehicle have been invented. Such screens are designed to be used when the motor vehicle is parked to provide fresh air to animals located inside the motor vehicle.

More particularly, dog owners know that dogs enjoy extending their heads outside the motor vehicle as it is moving. Because the dog may jump out of the window, many devices partially roll the window down to provide air to the animal. Unfortunately, when the dog attempts to extend its head through the small opening, its nose often touches the window leaving unsightly smudge marks. Also, when the dog stands on its hind legs and leans against the window, its front claws often mare or scratches the surface of the door adjacent to the window.

What is needed is a window cage that fits and extends through the window opening on a motor vehicle which allows fresh air into the motor vehicle. The screen should be made of material that does not smudge when contacted by an animal's nose. It should also include a means to protect the top edge of the door adjacent to the window when the dog stands upward and leans against the window. It should also include a temporary door attachment means that securely holds the device in the window opening when the motor vehicle is moving or when parked which prevents the animal from falling out of the vehicle.

SUMMARY OF THE INVENTION

Disclosed herein is a motor vehicle window cage that fits into and extends through a motor vehicle window opening. The cage is sufficiently large enough to fill the window opening and confine the animal inside the motor vehicle. The cage includes a cage component made of mesh with openings sufficient in size to allow outside air to flow into the vehicle. In the preferred embodiment, the cage component includes a mesh top surface, two mesh side surfaces, a mesh front surface, and a rear opening. Disposed between the lower edges of the two side surfaces and the front mesh surface is a rigid lower panel. The lower panel is designed to support the cage on the window's lower frame and allow an animal to stand upright with its hind legs on the seat and rest its front paws on the shelf. The lower panel is also sufficiently wide and made of durable material to support a small animal, if the animal jumps up thereon when the motor vehicle is parked.

The cage component is a relative rigid structure securely attached to the vehicle's door without modifying the door or the motor vehicle.

A first set of straps are attached to the upper edge of the cage component and extends around the window door's upper frame. A second set of straps attaches to the lower panel and extends downward around the lower portion of the door. Strap adjustment means are provided on both sets of straps that allow the lengths of the straps to be selectively adjusted to allow the cage to be used on different door shapes and sizes.

DESCRIPTION OF THE PREFERRED EMBODIMENT(S)

Figure 1:
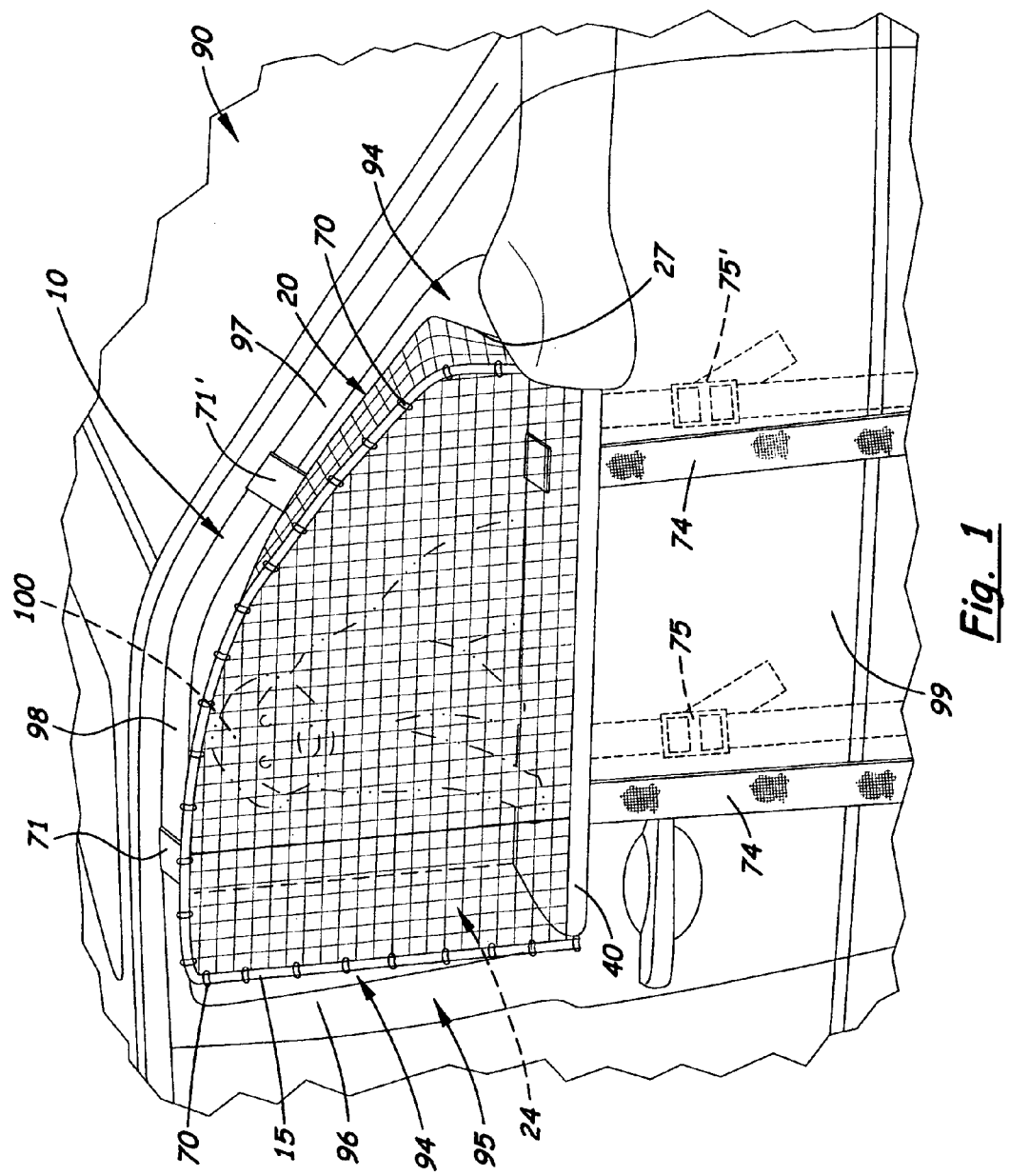
FIG. 1 is a front perspective view of the motor vehicle window cage inserted through the window on a vehicle showing a dog inside the cage.

Referring to the FIGS. 1–8, there is shown a motor vehicle window cage generally referred by the number 10 that includes one of two possible cage components 15 or 15' designed to fit into and extend through a window opening 94 on the door 95 of a motor vehicle 90. Both embodiments of the cage component 15, 15' are designed to confine an animal 100 inside the motor vehicle 90 yet allow an animal 100 to safely place its head into the center portion of the cage component 15 or 15' to receive fresh outside air when the motor vehicle 90 is parked.

In the first embodiment shown in FIGS. 1–7, the cage component 15 is a U-shaped, three-sided structure comprising a top mesh surface 20 and two side mesh surfaces 24, 27. The back portion of the cage component 15 is open thereby forming a rear opening 36 therein. The bottom portion of the cage component 15 is also open forming a bottom opening 37 therein (see FIG. 7), which is closed by a lower panel 40 during construction. The second embodiment of the cage component 15', shown in FIG. 8, includes an integrally formed bottom mesh surface 82 that eliminates the bottom opening 37.

On both two cage components 15, 15', the top mesh surface 20 are designed to abut against the upper frame 98 of the door 95 that surrounds the window opening 94. The two side mesh surfaces 24, 27 are designed to closely abut against the rear and front door frame members 96, 97, respectively, to confine the animal 100 inside the motor vehicle 90. In the Figs, the top mesh surface 20 is gently curved and the side mesh surfaces 24, 27, are substantially straight and extend diagonally outward. It should be understood that the orientation of the top and side mesh surfaces 20, 24, 27 may vary to fit closely into different window openings.

Figure 2:
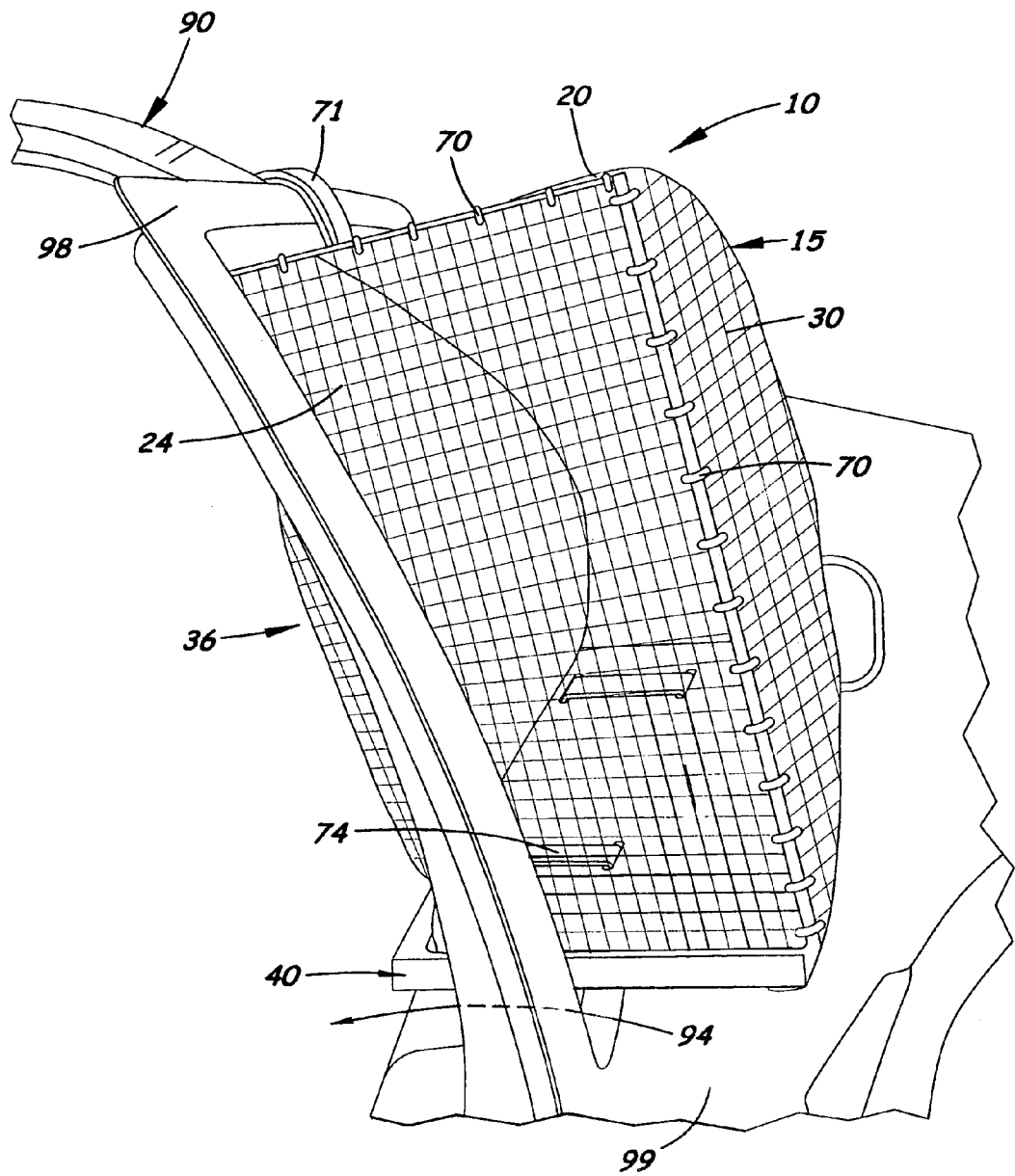
FIG. 2 is a rear perspective of the cage shown in FIG. 1 with the door opened thereby showing the placement of the cage inside the window opening.
Figure 3:
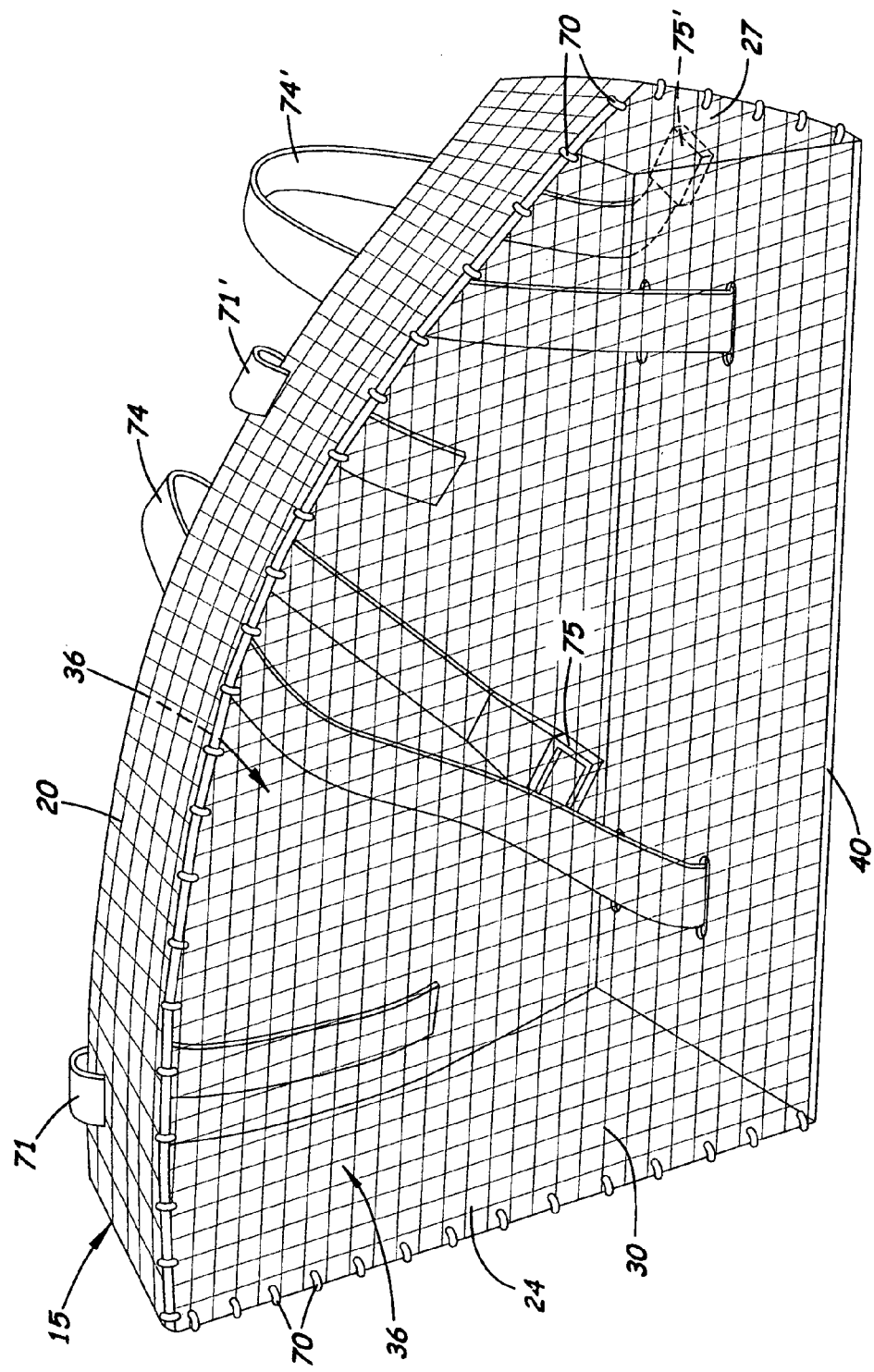
FIG. 3 is another front perspective view of the cage removed from the motor vehicle.
Figure 4:
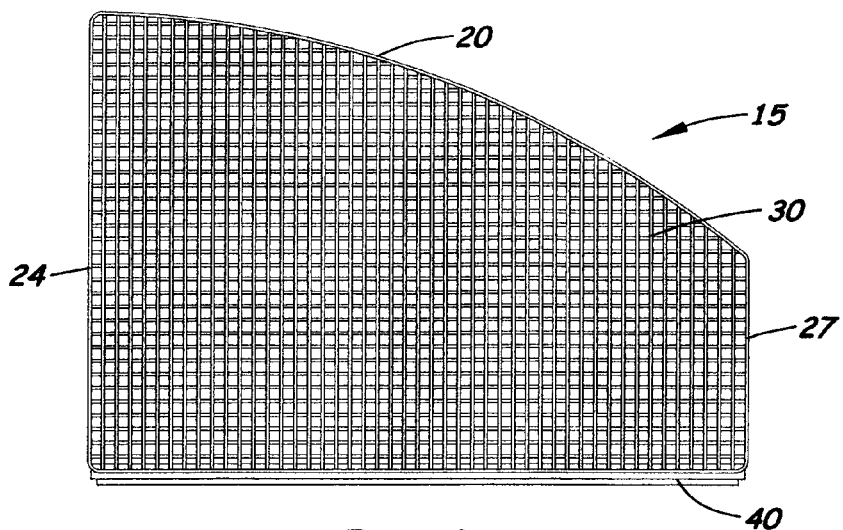
FIG. 4 is a front elevational view of the cage.
Figure 5:
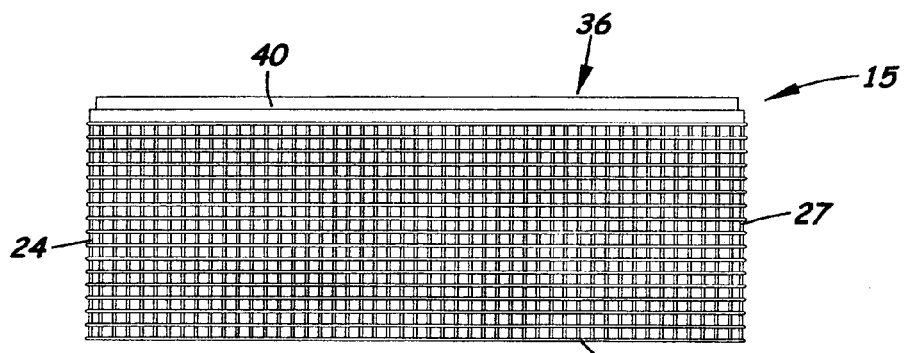
FIG. 5 is a top plan view of the cage.
Figure 6:
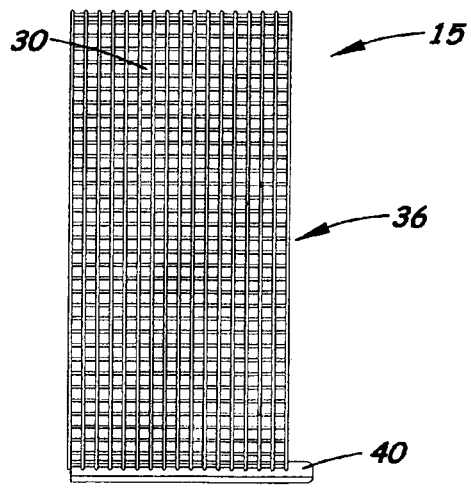
FIG. 6 is a left side elevational view of the cage.
Figure 7:
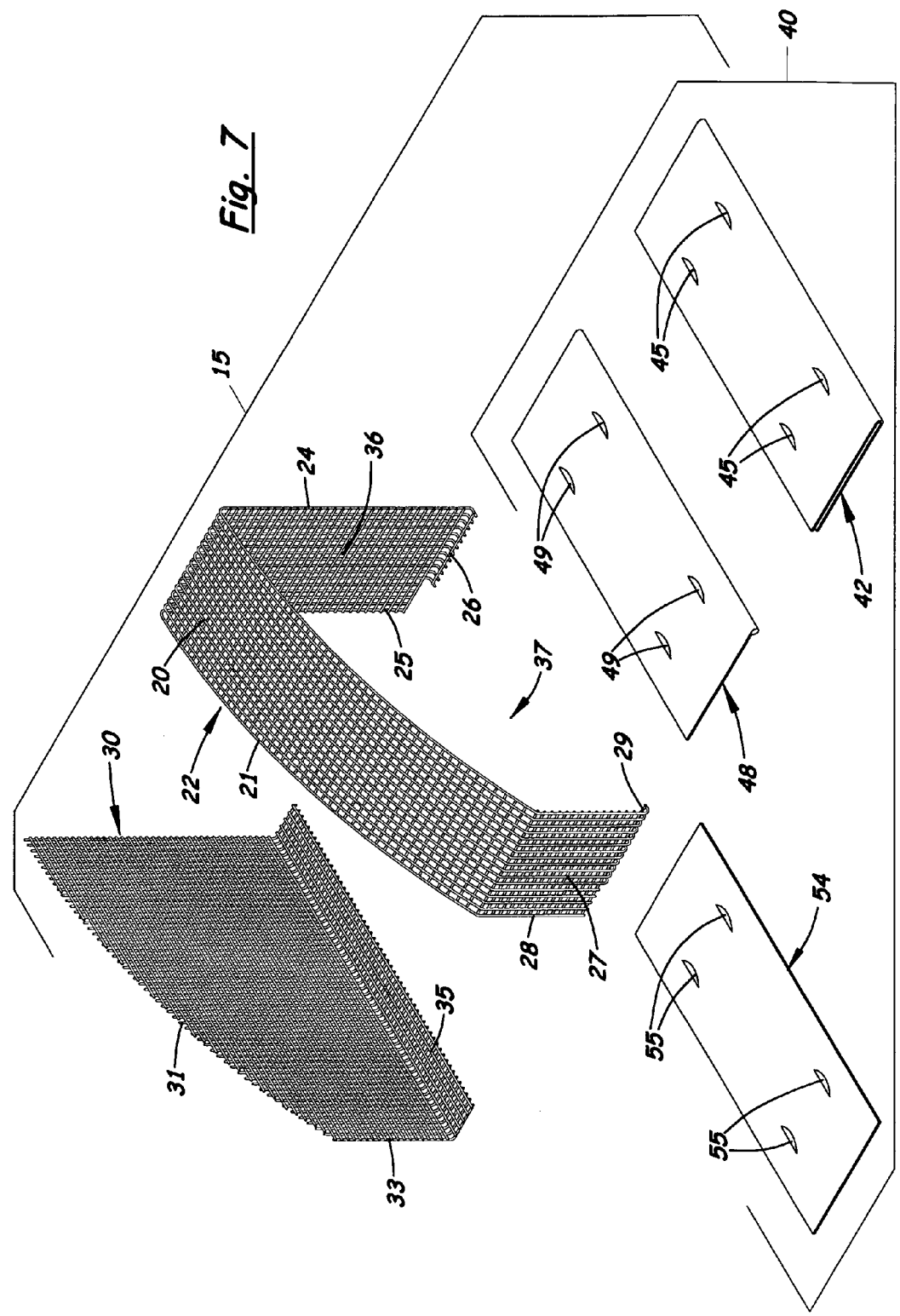
FIG. 7 is an exploded perspective view of the first embodiment of the cage showing how the bottom panel is attached over the bottom opening on the cage.

Disposed over the front opening on the cage component 15 is a front mesh surface 30. As shown in FIGS. 2, 3 and 7 the upper edge 31 and lateral edges 32, 33 of the front mesh surface 30 is complimentary in shape to the adjoining edges 21, 25 and 28 of the top mesh surface 20 and the two side mesh surfaces 24, 27, respectively. Suitable clips 70 or welds are used to attach the front mesh surface 30 to the top mesh surface 20 and to the two sided mesh surfaces 24, 27. As shown in FIG. 7, formed on the lower edges of the two side mesh surfaces 24, 27 and the front mesh surface 30 are inward extending edges 26, 29, and 35, respectively.

During assembly of the cage component 15, a lower panel 40 is placed into the bottom opening 37 and connected to the three inward extending edges 26, 29, and 35. As shown in FIG. 7, the lower panel 40 includes two rigid plates 48, 54 stacked above and below the opposite sides of the three inward extending edges 26, 29, 35. A rubber plate 42 with a center gap 43 formed therein is extended over the two support plates 48, 54 after they are properly positioned in the bottom opening 37. The center gap 43 is sufficiently narrow to closely fit over the two support plates 48, 54. The rubber plate 42 is slightly wider than the cage component 15 thereby created an inward extended ledge 44 for an animal 100 to stand or rest upon.

Figure 8:
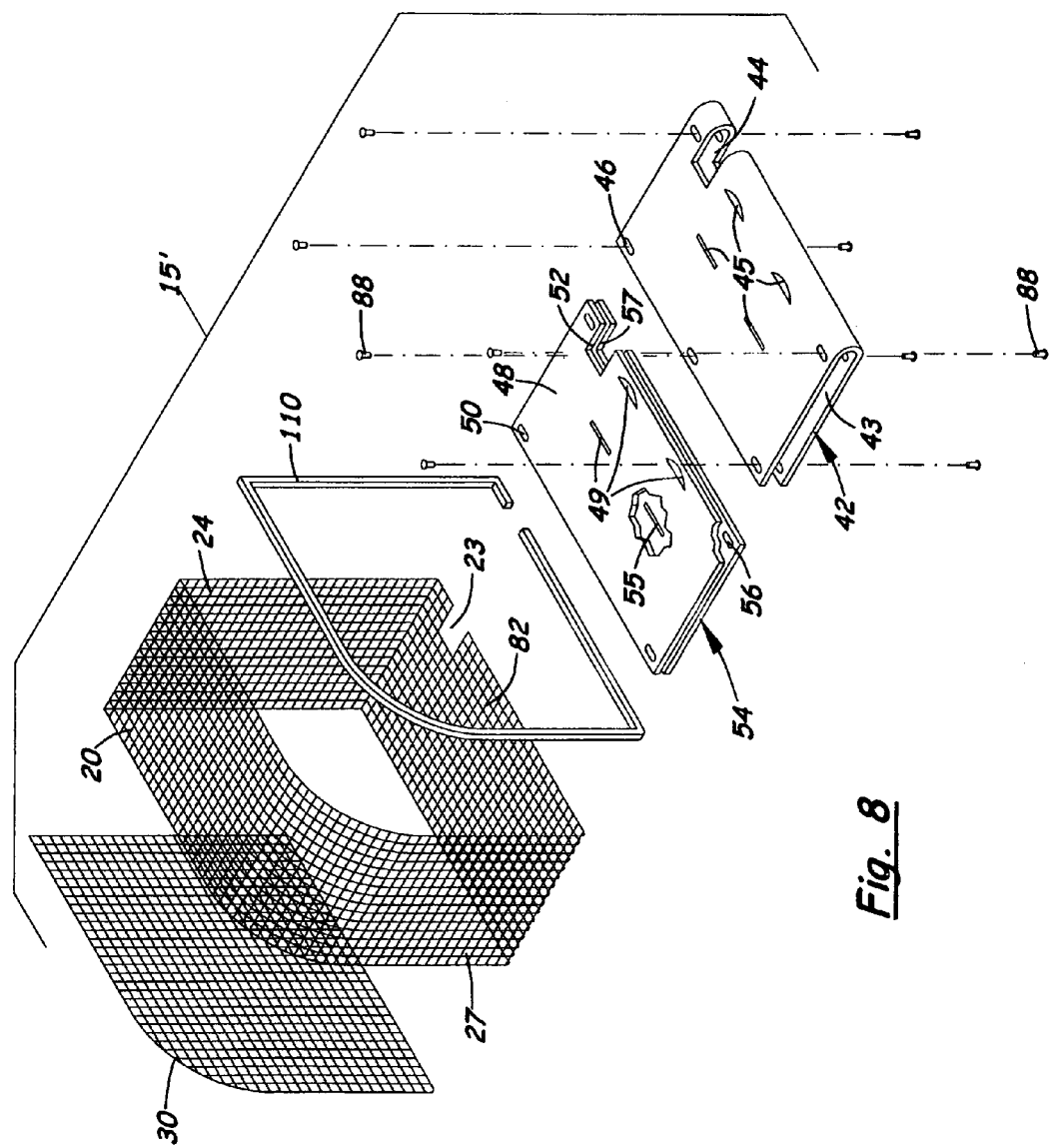
FIG. 8 is an exploded perspective view of the second embodiment of the cage showing a bottom panel attached to a bottom mesh surface.

FIG. 8 shows a second embodiment of the cage component, denoted 15', that includes an integrally formed bottom mesh surface 82. During assembly, the two support plates 48, 54 are stacked on the opposite top and bottom surfaces of the bottom mesh surface 82. The rubber plate 42 is then positioned so that the bottom mesh surface 82 and the two support plates 48, 54 may slide into the center gap 43.

In both embodiments, the rubber plate 42 and the two support plates 48, 54 each include a set of four holes 46, 50, 56, respectively, that are registered and aligned when the stacked together. Rivots 88 or some other suitable connectors are used to squeeze and hold the three plates 42, 48, 54 together. Also, formed on the inboard edges of the rubber plate 42 and the support plates 48, 54 are transversely aligned slots 44, 52, 57, respectively, which form a lock stem cutout designed to receive the upward protruding stem on the car door lock. Also, formed on the three plates 42, 48, 54 are four, longitudinally aligned strap slots 45, 49, 55, respectively, that are aligned and registered when the three plates 42, 48, 54 are stacked together. Two pairs of slots are transversely aligned on each plate 42, 48, and 54 to receive the two lower adjustable straps 74, 74' that extend around the lower portion 99 of the door 95.

An optional rubber frame 110 may be used on the inboard edge of the cage components 15 to prevent damage to the vehicle 90 or injury to the animal 100.

The cage component 15, 15' are designed to be easily attached and detached from the door 95 of a motor vehicle 90 with two upper adjustable straps 71, 71' and two lower adjustable straps 74, 74' that extend around the door's upper frame 98 and lower portion 99 of the door 95, respectively. In the preferred embodiment, the two upper straps 71, 71' are attached at one end to the inner, upper edge 21 of the top mesh surface 20. The opposite ends of the two upper straps 71, 71' wrap around the upper door frame 98. In the preferred embodiment, the two upper adjustable straps 71, 71' are equally spaced apart along the upper edge 21. The upper straps 71, 71' include complimentary hook and loop on opposing surfaces that are selectively connected together to adjust their overall lengths. In the preferred embodiment, each strap 71, 71' measures approximately 24 inches in length and 2 inches in width.

The lower adjustable straps 74, 74' extend through the outer elongated slots 45 formed on the lower panel 40 and then extend downward over the outside surface lower portion 99 of the door 95. The straps 74, 74' then extend upward over inside surface of the lower portion 99 of the door 95. The distal ends of the straps 74, 74' extends through the inner elongated slots 45' on the lower panel 40 transversely aligned with the outer elongated slots 45. Each strap 74, 74' includes an adjustment buckle 75, 75', respectively, that allows the user to adjust their lengths to fit different size doors 95.

The top mesh surface 20, two side mesh surfaces 24, 27 and the front mesh surface 30 are made of galvanized mesh-like material sufficiently durable and strong to prevent the animal 100 from falling through the window opening 94 when the animal 100 is pressing against or standing inside the cage component 15 or 15'. In the preferred embodiment, the mesh openings 16 on the cage components 15, 15' measure approximately ¼ to ½ inch wide. The individual wires that make up the mesh surfaces 20, 82, 24, 27, and 30 are approximately 0.041 inch thick and covered with a protective plastic coating. The cage components 15, 15' is designed to be manufactured in different sizes and shapes for different motor vehicles. For most motor vehicles, the cage 10 measures 15 to 23 inches in height, 8 to 12 inches in width, and 18 to 36 inches in length.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A motor vehicle door window cage, comprising:
   a. a cage structure capable of being placed into the window opening on a door on a motor vehicle, said cage structure includes a top mesh surface, two opposite side mesh surfaces, a front mesh surface, and a rear opening;
   b. a lower panel disposed inside said cage structure between said side mesh surfaces;
   c. a first set of adjustable straps attached to said cage structure capable of extending around an adjacent window frame on a door; and,
   d. a second set of adjustable door straps attached to said cage structure capable of extending around the lower portion of a door.

2. The window cage, as recited in claim 1 further including inward directed edges attached to said side mesh surfaces and said front mesh surface to which said lower panel is attached.

3. The window cage, as recited in claim 1, wherein said lower panel is made of metal.

4. The window cage, as recited in claim 2, wherein said lower panel is made of plastic.

5. The window cage, as recited in claim 2, further including an upper plate disposed over said lower panel, said upper plate extending over said inward directed edges of said side mesh surfaces and said front mesh surface.

6. The window cage, as recited in claim 1, further including an upper mat placed over said lower panel.

7. The window cage, as recited in claim 5, further including an upper mat placed over said upper plate.

8. The window cage, as recited in claim 1, wherein said top mesh surface and said side mesh surfaces formed an inverted U-shape cage member complimentary in shape to the window on a motor vehicle.

9. The window cage as recited in claim 8, wherein a plurality of clips are used to attach said front mesh surface to said cage member.

10. The window cage, as recited in claim 1, wherein said top surface is curved and complimentary in shape with the window opening on a motor vehicle.

* * * * *